(12) United States Patent
Eleftheriou et al.

(10) Patent No.: US 7,573,665 B2
(45) Date of Patent: Aug. 11, 2009

(54) MAGNETIC TAPE READ CHANNEL SIGNAL VALUES DEVELOPED EMPLOYING INTERMEDIATE BITS OF THE PATH MEMORY OF A PRML VITERBI DETECTOR

(75) Inventors: Evangelos S. Eleftheriou, Zurich (CH); Robert Allen Hutchins, Tucson, AR (US); Glen Alan Jaquette, Tucson, AR (US); Sedat Oelcer, Kilchberg (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/143,385

(22) Filed: Jun. 20, 2008

(65) Prior Publication Data

US 2008/0253012 A1 Oct. 16, 2008

Related U.S. Application Data

(63) Continuation of application No. 11/003,316, filed on Dec. 3, 2004, now Pat. No. 7,430,084.

(51) Int. Cl.
*G11B 5/09* (2006.01)
(52) U.S. Cl. .............................. 360/39; 360/29; 360/46; 360/65; 360/77.12
(58) Field of Classification Search ........................ None
See application file for complete search history.

(56) References Cited

U.S. PATENT DOCUMENTS

| | | | | |
|---|---|---|---|---|
| 5,412,669 A | | 5/1995 | Foland, Jr. .................. 714/796 |
| 5,416,651 A | * | 5/1995 | Uetake et al. .................. 360/48 |
| 5,432,820 A | * | 7/1995 | Sugawara et al. ............ 375/341 |
| 5,486,956 A | | 1/1996 | Urata ........................... 360/65 |
| 5,497,384 A | | 3/1996 | Fredrickson et al. .......... 371/43 |
| 5,654,667 A | | 8/1997 | Adachi ........................ 329/306 |
| 5,757,855 A | | 5/1998 | Strolle et al. ................. 375/262 |
| 5,771,127 A | | 6/1998 | Reed et al. ..................... 360/51 |
| 5,809,071 A | | 9/1998 | Kobayashi et al. ........... 375/229 |
| 5,857,002 A | | 1/1999 | Melas ......................... 375/290 |

(Continued)

FOREIGN PATENT DOCUMENTS

JP 10-150371 2/1998

OTHER PUBLICATIONS

"High Speed Detection of Signals from Digital Magnetic Recording Devices", IBM Technical Disclosure Bulletin, vol. 38, No. 12, Dec. 1995, pp. 369-371.

(Continued)

*Primary Examiner*—Hoa T Nguyen
*Assistant Examiner*—Dismery E Mercedes
(74) *Attorney, Agent, or Firm*—John H. Holcombe

(57) ABSTRACT

Magnetic tape read channel signal values are developed employing intermediate bits of the path memory of a PRML Viterbi detector. Identification logic identifies a most likely path memory state of the PRML Viterbi detector from the path metrics of the PRML Viterbi detector. An intermediate bit sequence of the identified most likely path memory state is obtained, the intermediate bit sequence extending from an initiation point of the path memory which is intermediate the output and the input of the PRML Viterbi detector. A sample value is determined which corresponds to the obtained intermediate bit sequence.

6 Claims, 4 Drawing Sheets

U.S. PATENT DOCUMENTS

| | | | |
|---|---|---|---|
| 5,937,020 A * | 8/1999 | Hase et al. | 375/376 |
| 5,938,788 A | 8/1999 | Hayashi | 714/794 |
| 5,946,329 A | 8/1999 | Hirose et al. | 714/795 |
| 5,961,658 A * | 10/1999 | Reed et al. | 714/746 |
| 5,970,104 A | 10/1999 | Zhong et al. | 375/341 |
| 6,097,769 A * | 8/2000 | Sayiner et al. | 375/341 |
| 6,104,766 A | 8/2000 | Coker et al. | 375/341 |
| 6,201,832 B1 | 3/2001 | Choi | 375/233 |
| 6,201,839 B1 | 3/2001 | Kavcic et al. | 375/341 |
| 6,201,840 B1 | 3/2001 | Rub et al. | 375/341 |
| 6,378,107 B1 | 4/2002 | Yoshinaka | 714/795 |
| 6,424,686 B1 * | 7/2002 | Hutchins et al. | 375/341 |
| 6,438,180 B1 | 8/2002 | Kavcic et al. | 375/341 |
| 6,597,526 B1 * | 7/2003 | Gray | 360/40 |
| 6,738,107 B2 * | 5/2004 | Nagase et al. | 349/39 |
| 6,791,776 B2 * | 9/2004 | Kato et al. | 360/39 |
| 6,792,571 B2 | 9/2004 | Shieh | 714/795 |
| 7,164,551 B2 * | 1/2007 | Urano et al. | 360/77.12 |
| 7,430,084 B2 * | 9/2008 | Eleftheriou et al. | 360/46 |
| 2002/0073378 A1 | 6/2002 | Shieh | 714/795 |
| 2002/0075861 A1 | 6/2002 | Behrens et al. | 370/359 |
| 2002/0174402 A1 | 11/2002 | Yamamoto | 714/795 |
| 2005/0089121 A1 | 4/2005 | Tsai et al. | 375/341 |
| 2005/0265492 A1 | 12/2005 | Haratsch | 375/341 |

OTHER PUBLICATIONS

Jaekyun Moon et al., "Ber Performance Comparisons in Digital Tape Recording", Global Telecommunications Conference, 1995, Globecom '95, IEEE, pp. 1384-1388.

Younggyun Kim et al., "Equalizer and Detector Performance in Digital VCRs", Communications, 1996, ICC 96, Conference Record, Converging Technologies for Tomorrow's Applications, 1996 IEEE, pp. 582-586.

J. G. Proakis, "Equalization Techniques for High-Density Magnetic Recording", Signal Processing Magazine, vol. 15, Iss. 4, IEEE, Jul. 1998, pp. 73-82.

\* cited by examiner

US 7,573,665 B2

MAGNETIC TAPE READ CHANNEL SIGNAL VALUES DEVELOPED EMPLOYING INTERMEDIATE BITS OF THE PATH MEMORY OF A PRML VITERBI DETECTOR

CROSS REFERENCE TO RELATED APPLICATION

The present application is a continuation of parent application Ser. No. 11/003,316, filed Dec. 3, 2004, now U.S. Pat. No. 7,430,084.

FIELD OF THE INVENTION

This invention relates to magnetic tape drives, and, more particularly, to magnetic tape read channels employing PRML Viterbi detectors.

BACKGROUND OF THE INVENTION

Magnetic tape cartridges provide a means to store data on magnetic tape to be saved and read back at a subsequent time. A magnetic tape drive writes the data to magnetic tape, typically as a set of parallel tracks, and subsequently a magnetic tape drive reads back the data. To read back the data, a magnetic tape drive typically comprises parallel read heads to read each of the parallel tracks, a drive system for moving a magnetic tape with respect to the read heads such that the read heads may detect magnetic signals on the magnetic tape, and a read channel for digitally sampling magnetic signals detected by the read heads, providing digital samples of the magnetic signals. The digital samples are then decoded into data bits, and the data bits from the parallel tracks are combined into the data that was saved. Magnetic tapes may be interchanged between tape drives, such that a magnetic tape written on one tape drive will be read by another tape drive. Variation in the response of the read heads to the variously written magnetic tapes may result in unacceptably poor read back of the recorded signals.

The read channel typically employs a number of elements to provide an acceptable readback of the recorded signals, for example comprising: an analog to digital converter (ADC) to provide asynchronous digital samples of the input signal; an equalizer to compensate for the change in the signal due to the magnetic recording properties of the write head, the magnetic tape, and the read head; a mid linear filter to obtain, additionally to the digital samples, mid-sampling-time instant values from which the asynchronous digital samples are derived; an interpolator to convert the asynchronous digital samples to synchronous digital samples; a gain control to adjust the amplitude of the synchronous digital samples; and a data detector. The values of the digital samples are typically not values of ideal read signals. In fact, they may vary considerably from the ideal values. In some instances, such as with respect to the gain control and the interpolator, error signals are fed back to allow adjustment of the parameters of those elements.

The error signals to adjust the parameters of elements such as the gain control and the interpolator, are typically derived directly from the digital samples after equalization, interpolation and gain have been applied. For example, a slicer may be provided to relate the synchronous digital samples to the closest ideal values and to detect errors between the synchronous digital samples and the closest ideal values. Those errors comprise error signals which are fed back to allow adjustment of the parameters of those elements. However, since the values of the synchronous digital samples typically vary from values of ideal read signals, and those digital samples may represent recorded signals that are substantially different than the closest ideal values (such as a digital sample of value "+1.05" may represent an intended ideal value of "+2", but is closest to an ideal value of "+1"), the errors used to make the adjustments to the parameters of various elements may be inaccurate and result in a "noisy" feedback.

SUMMARY OF THE INVENTION

Provided are magnetic tape drives, magnetic tape read channel detectors, logic and methods for providing sample values with respect to input samples of a magnetic read signal.

A magnetic tape drive comprises at least one read head, a drive system for moving a magnetic tape with respect to the read head(s) such that the read head(s) may detect magnetic signals on the magnetic tape; a read channel for digitally sampling magnetic signals detected by the read head(s), providing digital samples of the magnetic signals, and a magnetic tape read channel detector.

In one embodiment, magnetic tape read channel signal values are developed employing intermediate bits of the path memory of a PRML Viterbi detector. A PRML Viterbi detector comprises an input, path metrics, a path memory, and an output. Identification logic identifies a most likely path memory state of the PRML Viterbi detector from the path metrics of the PRML Viterbi detector; a selector obtains from the path memory of the PRML Viterbi detector, an intermediate bit sequence of the identified most likely path memory state, the intermediate bit sequence extending from an initiation point which is intermediate the output and the input of the PRML Viterbi detector, the initiation point corresponding to the time index of an input sample of the magnetic read signal; and most likely sample logic determines a sample value corresponding to the obtained intermediate bit sequence.

In another embodiment, an error term processor processes the determined sample value and the input sample of the magnetic read signal corresponding to the initiation point, to provide at least one error signal.

In one embodiment, the error term processor delays the input sample of the magnetic read signal to align the input sample of the magnetic read signal with the determined sample value.

In further embodiments, the error signal(s) may comprise gain error signal(s), timing error signal(s), e.g. employed to derive metrics for driving the gain and/or timing control feedback loops; equalizer error signal(s), e.g. for deriving equalizer control metrics; and error signals accumulated to provide error information, e.g. for error analysis and/or calibration.

In one embodiment, the selector programmably selects the initiation point.

In one embodiment, the selector obtains from the PRML Viterbi detector path memory, a plurality of intermediate bit sequences of the identified most likely path memory state, the intermediate bit sequences each extending from a separate initiation point which is intermediate the output and the input of the PRML Viterbi detector, the initiation points corresponding to input samples of the magnetic read signal.

In a further embodiment, a processor delays the input samples of the magnetic read signal to align the input samples of the magnetic read signal with the determined sample values of the corresponding initiation points.

In one embodiment, the identification logic compares the path metrics of the PRML Viterbi detector, and identifies the path metric having the greatest probability.

In one embodiment, the most likely sample logic selects a sample value identified as matching the obtained intermediate bit sequence.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
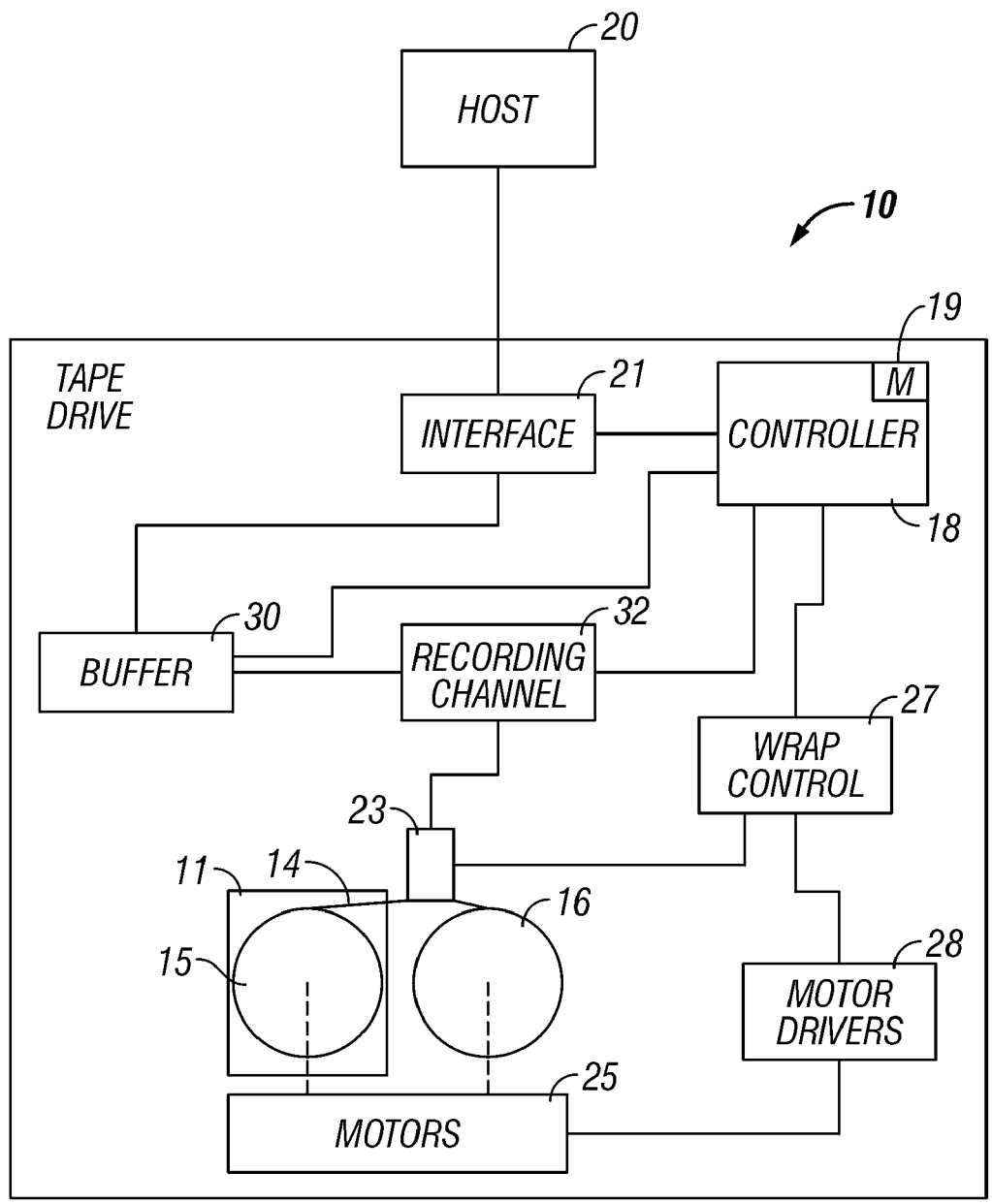
FIG. 1 is a block diagram of an embodiment of a magnetic tape drive which may implement the present invention.

Referring to FIG. 1, a magnetic tape drive 10 is illustrated which may implement aspects of the present invention. The magnetic tape drive provides a means for reading and writing information with respect to a magnetic tape 14 of a magnetic tape cartridge 11.

Magnetic tape cartridges provide a means to store data on magnetic tape to be saved and read at a subsequent time. Further, the magnetic tape cartridges may be interchanged between tape drives, such that a magnetic tape written on one tape drive will be read by another tape drive.

As is understood by those of skill in the art, a magnetic tape cartridge 11 comprises a length of magnetic tape 14 wound on one or two reels 15, 16.

A single reel magnetic tape cartridge 11 is illustrated, examples of which are those adhering to the Linear Tape Open (LTO) format. An example of a magnetic tape drive 10 is the IBM 3580 Ultrium magnetic tape drive based on LTO technology. A further example of a single reel magnetic tape drive and associated cartridge is the IBM 3592 TotalStorage Enterprise magnetic tape drive and associated magnetic tape cartridge. An example of a dual reel cartridge is the IBM 3570 magnetic tape cartridge and associated drive.

Also as is understood by those of skill in the art, a magnetic tape drive 10 comprises one or more controllers 18 of a recording system for operating the magnetic tape drive in accordance with commands received from a host system 20 received at an interface 21. A controller typically comprises logic and/or one or more microprocessors with a memory 19 for storing information and program information for operating the microprocessor(s). The program information may be supplied to the memory via the interface 21, by an input to the controller 18 such as a floppy or optical disk, or by read from a magnetic tape cartridge, or by any other suitable means. The magnetic tape drive 10 may comprise a standalone unit or comprise a part of a tape library or other subsystem. The magnetic tape drive 10 may be coupled to the host system 20 directly, through a library, or over a network, and employ at interface 21 a Small Computer Systems Interface (SCSI), an optical fiber channel interface, etc.

The magnetic tape cartridge 11 may be inserted in the magnetic tape drive 10, and loaded by the magnetic tape drive so that one or more read and/or write heads 23 of the recording system reads and/or writes information in the form of signals with respect to the magnetic tape 14 as the tape is moved longitudinally by one or more motors 25 which rotate the reels 15, 16. The magnetic tape typically comprises a plurality of parallel tracks, or groups of tracks. In some formats, such as the LTO format, above, the tracks are arranged in a serpentine back and forth pattern of separate wraps, as is known to those of skill in the art. Also as known to those of skill in the art, the recording system may comprise a wrap control system 27 to electronically switch to another set of read and/or write heads, and/or to seek and move the read and/or write heads 23 laterally of the magnetic tape, to position the heads at a desired wrap or wraps, and, in some embodiments, to track follow the desired wrap or wraps. The wrap control system may also control the operation of the motors 25 through motor drivers 28, both in response to instructions by the controller 18.

Controller 18 also provides the data flow and formatter for data to be read from and written to the magnetic tape, employing a buffer 30 and a recording channel 32, as is known to those of skill in the art.

The drive system comprising at least motors 25 and reels 15, 16 moves a magnetic tape 14 with respect to the read head(s) 23 such that the read head(s) may detect magnetic signals on the magnetic tape, and a read channel of the recording channel 32 digitally samples the magnetic signals detected by the read head(s), providing digital samples of the magnetic signals, and determining the read signal data.

Figure 2:
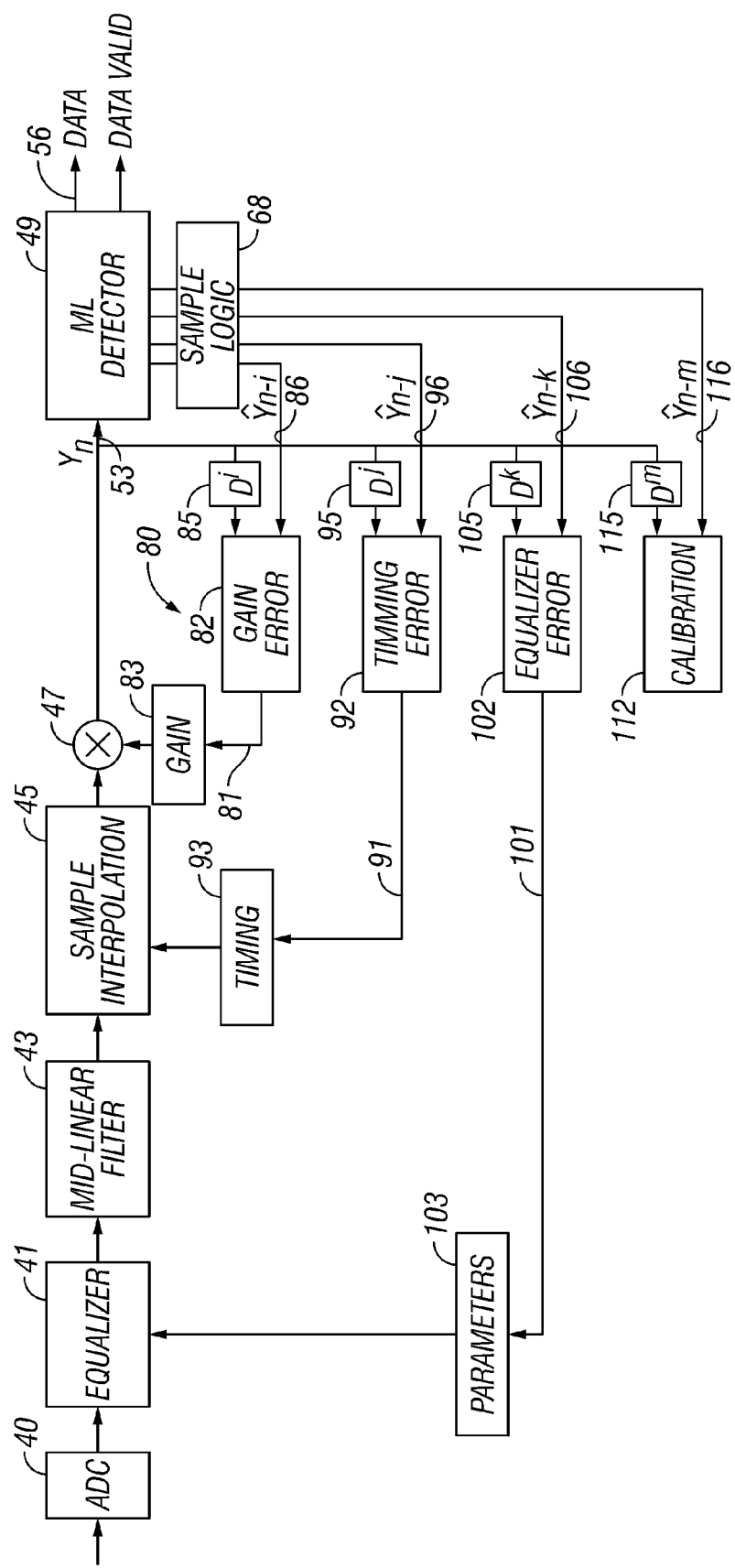
FIG. 2 is a block diagram of an embodiment of a magnetic tape read channel detector in accordance with the present invention.

Referring to FIG. 2, a read channel typically employs a number of elements to provide an acceptable readback of the recorded signals, for example comprising: an analog to digital converter (ADC) 40 to provide asynchronous digital samples of the input signal; an equalizer 41 to compensate for the change in the signal due to the magnetic recording properties of the write head, the magnetic tape, and the read head; a mid linear filter 43 to obtain, additionally to the digital samples, mid-sampling-time instant signal values from which the asynchronous digital samples are derived; an interpolator 45 to convert the asynchronous digital samples to synchronous digital samples; and a gain control 47 to adjust the amplitude of the synchronous digital samples. A data detector 49 is employed to determine the read signal data. The values of the digital samples are typically not values of ideal read signals when provided by the ADC 40, and are not in alignment with the timing of ideal samples. The functions of the equalizer 41, interpolator 45, and gain control 47 are to provide synchronous digital samples that are properly time aligned and have values that represent the waveform of the signals read back from the magnetic tape. The synchronous signals may themselves vary considerably from the ideal values. Hence, error signals may be employed to modify the parameters of the equalizer 41, interpolator 45, and gain control 47 to provide more accurate synchronous read signals, as will be discussed.

A function of the data detector 49 is to determine the originally recorded data from the synchronous read signals that have been equalized, etc.

Figure 3:
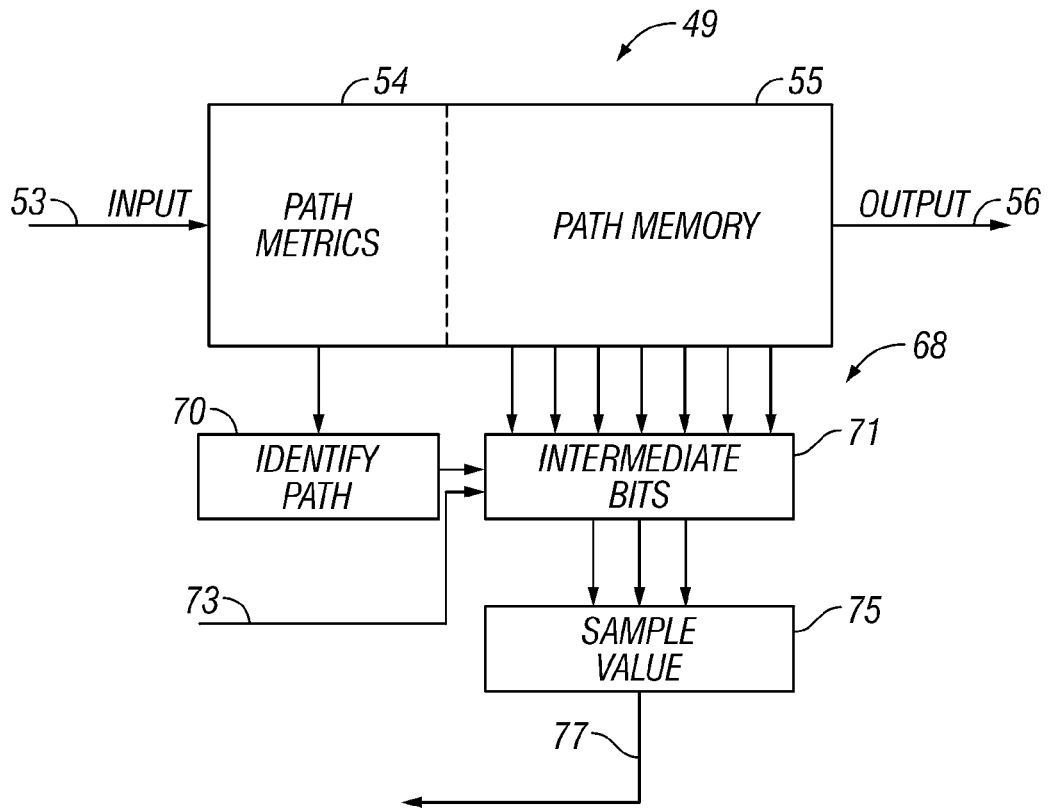
FIG. 3 is a block diagram of an embodiment of a PRML Viterbi detector and an embodiment of logic for providing sample values with respect to input samples of a magnetic read signal in accordance with the present invention.

Referring additionally to FIG. 3, one example of a data detector is a PRML (Partial Response Maximum Likelihood) Viterbi detector, which is known to those of skill in the art. A PRML Viterbi detector 49 comprises an input 53, path metrics 54, a path memory 55, and an output 56. Briefly, a PRML Viterbi detector analyzes the sequence of input samples, estimating the likelihoods of various data bit sequences in path metrics 54 in the context of a state machine, applying the likely bit sequences to a path memory 55 which is of an overall length such that the likely bit sequences converge to provide an output 56 on a bit by bit basis of the data. The PRML Viterbi detector 49 may take any of many forms, representing various logic arrangements (examples comprise accumulating registers, calculators, etc.); representing various data sampling and decoding arrangements (examples comprise PR4, EPR4, EEPR4, etc.); and representing various data formats (examples comprise "1" bits representing transitions and "0" bits the absence of transitions, or "1" bits representing magnetization in a first direction and "0" bits the opposite direction); all as known to those of skill in the art.

Figure 4:
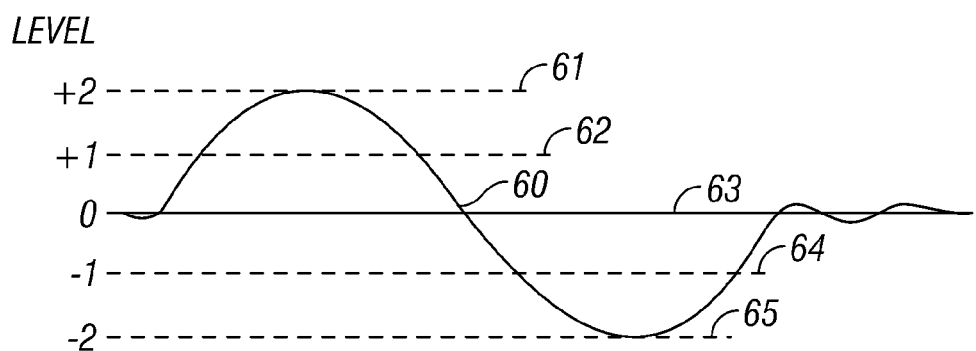
FIG. 4 is a diagrammatic illustration of a magnetic tape read waveform illustrating EPR4 signal levels.

FIG. 4 illustrates the various ideal levels of amplitudes of samples in the EPR4 (Extended Partial Response Class 4) format, and an exemplary read signal 60 representing adjacent positive and negative transitions. The various ideal levels comprise "+2" 61, "+1" 62, "0" 63, "−1" 64, and "−2" 65, in one convention. Another convention describes the ideal levels as "+1", "+½", "0" "−½", and "−1". A digital sample of the received signal provided at input 53 of the PRML Viterbi detector 49 may have a value of "1.05", for example, and the function of the PRML Viterbi detector is to analyze the input sample with respect to a sequence of input samples, estimating the likelihoods of various data bit sequences in the path metrics 54, and applying the likely bit sequences to a Viterbi trellis in a path memory 55. For example, the digital sample may fall in a hypothesized trellis sequence where the ideal value of the signal is "+2". As discussed above, the PRML Viterbi detector provides as an output 56, the data of the signals in the form of bits in one of the various data formats, i.e. "0" and "1" bits, and the actual ideal value of the signal is not provided and is irrelevant to the output of the detector.

An example of an EPR4 metric calculation and path memory is described below:

Log Likelihood Functions $$m_k(0)=\max imum\{m_{k-1}(0)+\ln [p(y_k|s_k=0; a_k=0)]; m_{k-1}(1)+\ln [p(y_k|s_k=1; a_k=0)]\}$$

$$m_k(1)=\max imum\{m_{k-1}(2)+\ln [p(y_k|s_k=2; a_k=0)]; m_{k-1}(3)+\ln [p(y_k|s_k=3; a_k=0)]\}$$

$$m_k(2)=\max imum\{m_{k-1}(4)+\ln [p(y_k|s_k=4; a_k=0)]; m_{k-1}(1)+\ln [p(y_k|s_k=5; a_k=5)]\}$$

$$m_k(3)=\max imum\{m_{k-1}(6)+\ln [p(y_k|s_k=6; a_k=0)]; m_{k-1}(7)+\ln [p(y_k|s_k=7; a_k=0)]\}$$

$$m_k(4)=\max imum\{m_{k-1}(0)+\ln [p(y_k|s_k=0; a_k=0)]; m_{k-1}(1)+\ln [p(y_k|s_k=1; a_k=1)]\}$$

$$m_k(5)=\max imum\{m_{k-1}(2)+\ln [p(y_k|s_k=2; a_k=1)]; m_{k-1}(3)+\ln [p(y_k|s_k=3; a_k=1)]\}$$

$$m_k(6)=\max imum\{m_{k-1}(4)+\ln [p(y_k|s_k=4; a_k=1)]; m_{k-1}(5)+\ln [p(y_k|s_k=5; a_k=1)]\}$$

$$m_k(7)=\max imum\{m_{k-1}(6)+\ln [p(y_k|s_k=6; a_k=1)]; m_{k-1}(7)+\ln [p(y_k|s_k=7; a_k=1)]\}$$

Metric Calculations $$m_k(0)=\max imum\{m_{k-1}(0)+2\mu_{0/0}y_k-\mu_{0/0}^2; m_{k-1}(1)+2\mu_{1/0}y_k-\mu_{1/0}^2\}$$

$$m_k(1)=\max imum\{m_{k-1}(2)+2\mu_{2/0}y_k-\mu_{2/0}^2; m_{k-1}(3)+2\mu_{3/0}y_k-\mu_{3/0}^2\}$$

$$m_k(2)=\max imum\{m_{k-1}(4)+2\mu_{4/0}y_k-\mu_{4/0}^2; m_{k-1}(5)+2\mu_{5/0}y_k-\mu_{5/0}^2\}$$

$$m_k(3)=\max imum\{m_{k-1}(6)+2\mu_{6/0}y_k-\mu_{6/0}^2; m_{k-1}(7)+2\mu_{7/0}y_k-\mu_{7/0}^2\}$$

$$m_k(4)=\max imum\{m_{k-1}(0)+2\mu_{0/1}y_k-\mu_{0/1}^2; m_{k-1}(1)+2\mu_{1/1}y_k-\mu_{1/1}^2\}$$

$$m_k(5)=\max imum\{m_{k-1}(2)+2\mu_{2/1}y_k-\mu_{2/1}^2; m_{k-1}(3)+2\mu_{3/1}y_k-\mu_{3/1}^2\}$$

$$m_k(6)=\max imum\{m_{k-1}(4)+2\mu_{4/1}y_k-\mu_{4/1}^2; m_{k-1}(5)+2\mu_{5/1}y_k-\mu_{5/1}^2\}$$

$$m_k(7)=\max imum\{m_{k-1}(6)+2\mu_{6/1}y_k-\mu_{6/1}^2; m_{k-1}(7)+2\mu_{7/1}y_k-\mu_{7/1}^2\}$$

EPRIV Ideal Values $\mu_{0/0}=0$ $\mu_{1/0}=h_3=-1$ $\mu_{2/0}=h_2=-1$ $\mu_{3/0}=h_2+h_3=-2$ $\mu_{4/0}=h_1=1$ $\mu_{5/0}=h_1+h_3=0$ $\mu_{6/0}=h_1+h_2=0$ $\mu_{7/0}=h_1+h_2+h_3=-1$ $\mu_{0/1}=h_0=1$ $\mu_{1/1}=h_0+h_3=0$ $\mu_{2/1}=h_0+h_2=0$ $\mu_{3/1}=h_0+h_2+h_3=-1$ $\mu_{4/1}=h_0+h_1=2$ $\mu_{5/1}=h_0+h_1+h_3=1$ $\mu_{6/1}=h_0+h_1+h_2=1$ $\mu_{7/1}=h_0+h_1+h_2+h_3=0$ Where:
m=metric
y=received sample value
s=state of the state machine
a=bit representing the "data"
$\mu$=ideal value of estimated sample value at various states of the state machine
h=sample value of the EPR4 channel impulse response
k=current sample
0, +1, +2, −1, −2=ideal sample values In one embodiment, referring to FIG. 2, magnetic tape read channel signal values are developed by sample logic 68 employing intermediate bits of the path memory of a PRML Viterbi detector. The signal values may be employed to develop error terms, for calibration, and for other purposes.

Referring to FIG. 3, an embodiment of sample logic 68 comprises identification logic 70 which identifies a most likely path memory state of the PRML Viterbi detector 49 from the path metrics 54 of the PRML Viterbi detector. In one embodiment, the identification logic 70 compares the path metrics, all of the "m" values in the above example, of the PRML Viterbi detector, and identifies the path metric having the greatest probability.

An embodiment of identification logic 70 comprises:
Determine the Maximum Metric Compare all of the metrics ($m_k(0)$, $m_k(1)$, . . . and choose the path metric associated with the largest value. For example, if $m_k(6)$ is the largest metric, then choose the path metric associated with state 6.

This logic comprises two sets of multiplexers:

Compare $m_k(0)$ and $m_k(1)$ and if $m_k(0)$ is larger, pass $m_k(0)$ else pass $m_k(1)$.

Compare $m_k(0)$ and $m_k(1)$ and if $m_k(0)$ is larger, pass state=0 else state=1.

Where:
m=metric
k=current sample

The banks of logic are cascaded so that, in one example, there are four compares, then two, and then one. The largest metric and the associated state are passed down through the logic until the final stage which only outputs the index of the largest state.

A selector 71 of sample logic 68 obtains a bit sequence from the path memory of the PRML Viterbi detector. The bit sequence is obtained from the path memory state identified by the identification logic 70, and is an intermediate bit sequence of the identified most likely path memory state.

The intermediate bit sequence obtained by selector 71 extends from an initiation point which is intermediate the output and the input of the PRML Viterbi detector. The initiation point corresponds to the time index of an input sample of the magnetic read signal which has been processed by the PRML Viterbi detector through various steps to reach the initiation point. As one example, the input sample has been processed when it was received by the PRML Viterbi detector, and each time a subsequent input sample has been received. Thus, the intermediate bits along the path memory represent the sequence of "data" of the received samples at the specific points of analysis by the PRML Viterbi detector. The "data" of each of the path memory states of the path memory may be different, representing the current state of the evaluation of the samples along that path. The paths will converge by the time the output 56 is reached for each data bit, as is known to those of skill in the art.

The closer the intermediate bits are to the output 56, the more reliable is their value. Conversely, the closer the intermediate bits are to the input 53, the less reliable is the value of these bits. Further, if the intermediate bits are to be used in a feedback loop, the closer the intermediate bits are to the output 56, the greater the delay that is introduced into the feedback loop, and the delay has the potential to introduce instability into the feedback loop. Conversely, the closer the intermediate bits are to the input 53, the less the delay that is introduced into the feedback loop.

The selector 71 may, in one embodiment, be fixed to select the intermediate bits at a particular initiation point, or, in an alternative embodiment, may programmably select the initiation point. In one example, the selector may be selectively programmed by a signal at an input 73, for example, by a control unit, such as controller 18 in FIG. 1, or by means of an external input, for example, at interface 21.

Still referring to FIG. 3, the number of intermediate bits of the sequence along the path selected by selector 71 may, in one example, be consistent with the number of samples required to define a complete transition in the selected decoding scheme, such as PR4, EPR4, EEPR4, etc. Alternatively, an excess number of intermediate bits may be selected.

Referring to FIG. 3, most likely sample logic 75 of sample logic 68 determines a sample value corresponding to the obtained intermediate bit sequence from selector 71.

For example, the obtained intermediate bit sequence may comprise "1-0-1-1" reading to the left from the initiation point, indicating that the ideal sample value is "−1", which value is provided by the most likely sample logic at output 77. The most likely sample logic 75, however, may be arranged in accordance with the expected read signals such that the corrections provided by an ideally set up equalizer 41, mid-linear filter 43, sample interpolator 45 and gain 47 of FIG. 2 are known to provide an actual best sample value that differs from an "ideal" value. For example, instead of an ideal value of "−1.00", the best sample value may be "−0.98". The information will enhance the error signals in an error feedback, analysis or calibration environment, as will be discussed.

In one embodiment, the most likely sample logic 75 of FIG. 3 selects a sample value identified as matching the obtained intermediate bit sequence, for example, from a table. In an alternative embodiment, the most likely sample logic 75 calculates a sample value from data relating to the obtained intermediate bit sequence.

An embodiment of most likely sample logic 75 comprises:

| Determine the sample estimate | | |
|---|---|---|
| $s_k$ | $a_k$ | $\hat{y}_k$ |
| 0 | 0 | $\mu_{0/0}$ |
| 1 | 0 | $\mu_{1/0}$ |
| 2 | 0 | $\mu_{2/0}$ |
| 3 | 0 | $\mu_{3/0}$ |
| 4 | 0 | $\mu_{4/0}$ |
| 5 | 0 | $\mu_{5/0}$ |
| 6 | 0 | $\mu_{6/0}$ |
| 7 | 0 | $\mu_{7/0}$ |
| 0 | 1 | $\mu_{0/1}$ |
| 1 | 1 | $\mu_{1/1}$ |
| 2 | 1 | $\mu_{2/1}$ |
| 3 | 1 | $\mu_{3/1}$ |
| 4 | 1 | $\mu_{4/1}$ |
| 5 | 1 | $\mu_{5/1}$ |
| 6 | 1 | $\mu_{6/1}$ |
| 7 | 1 | $\mu_{7/1}$ |

$1+(P_1-N_0)D+(P_2-N_1)D^2+(P_3-N_2)D^3-N_3D^4$

Where:
P=positive
N=negative
D=delay

By correctly setting the partial coefficients, this structure can support all of the fundamental partial response channels,

| | PR4 | EPR4 | EEPR4 |
|---|---|---|---|
| P1 | 1 | 2 | 3 |
| P2 | 0 | 1 | 3 |
| P3 | 0 | 0 | 1 |
| N0 | 1 | 1 | 1 |
| N1 | 1 | 2 | 3 |
| N2 | 0 | 1 | 3 |
| N3 | 0 | 0 | 1 |

$h_0=1$ $h_1 = P_1 - N_0$ $h_2 = P_2 - N_1$ $h_3 = P_3 - N_2$ $h_4 = -N_3$

Where:
P=positive
N=negative
h=sample value of the channel impulse response

Referring to FIGS. 2 and 3, in another embodiment, an error term processor 80 processes the determined sample value from sample logic 68 and the input sample 53 of the magnetic read signal corresponding to the initiation point, to provide at least one error signal.

In one embodiment, the error term processor 80 delays the input sample 53 of the magnetic read signal to align the input sample 53 of the magnetic read signal with the determined sample value from sample logic 68.

In one embodiment, the error signal(s) comprise gain error signal(s) 81 provided by gain error processor 82 to derive metrics for driving a gain control feedback loop 83. The error term processor 80 delays 85 the input sample 53 of the magnetic read signal to align the input sample 53 of the magnetic read signal with the determined sample value 86 from sample logic 68. As an example the gain feedback loop may be considered sensitive to delay, and, therefore, the intermediate bit sequence obtained by selector 71 extends from an initiation point which is close to the input 53 of PRML Viterbi detector 49 so that less delay is introduced into the feedback loop.

An embodiment of a gain error processor 82 to derive metrics for driving a gain control feedback loop 83 comprises comparing the absolute value of the determined sample value 86 from sample logic 68 to the absolute value of the delayed 85 input sample 53. The net difference is a measure of the gain error. For example, if the absolute value of the determined sample value 86 is "1" and the absolute value of the delayed 85 input sample 53 is "1.05", the net difference is "+0.05", indicating that the gain may be too high. Those of skill in the art understand that many alternative types of gain error processors and gain feedback loops may be utilized.

Referring to FIGS. 2 and 3, in one embodiment, the error signal(s) comprise timing error signal(s) 91 provided by timing error processor 92 to derive metrics for driving a timing control feedback loop 93. The error term processor 80 delays 95 the input sample 53 of the magnetic read signal to align the input sample 53 of the magnetic read signal with the determined sample value 96 from sample logic 68. As an example, the timing feedback loop may have some sensitivity to delay, and, therefore, the intermediate bit sequence obtained by selector 71 extends from an initiation point which is somewhat close to the input 53 of PRML Viterbi detector 49 so that less delay is introduced into the feedback loop.

An embodiment of a timing control error processor 92 to derive metrics for driving a timing control feedback loop 93 comprises:

Phase-Error $\phi_{error} = \hat{y}_n y_{n-1} - \hat{y}_{n-1} y_n$

Where:
y=received sample value
n=received sample index
φ=phase error
y=estimated sample value Those of skill in the art understand that many alternative types of timing error processors and timing feedback loops may be utilized.

Referring to FIGS. 2 and 3, in one embodiment, the error signal(s) comprise equalizer error signal(s) 101 provided by equalizer error processor 102 to derive metrics for providing equalizer control error signal(s), e.g. for deriving equalizer parameter metrics 103. The equalizer parameters may or may not comprise a feedback loop. The error term processor 80 may delay 105 the input sample 53 of the magnetic read signal to align the input sample 53 of the magnetic read signal with the determined sample value 106 from sample logic 68. As an example, the equalizer parameter metrics may have little, if any, sensitivity to a delay, and, therefore, the intermediate bit sequence obtained by selector 71 extends from an initiation point which is close to the output 56 of PRML Viterbi detector 49 so that the intermediate bits are more accurate. Alternatively, if no feedback loop were involved, for example the equalizer parameter metrics were to be defined offline, the input sample 53 of the magnetic read signal and the determined sample value 106 may be stored and aligned by the relative positions as stored.

As is known to those of skill in the art, the parameters of the equalizer are set in accordance with an algorithm or algorithms which may have the name "LMS" (Least Mean Square) algorithm, of which there are many. An example of an error term utilized in the algorithm comprises:

LMS Error $lms_{error} = y_n - \hat{y}_n$

Where:
y=received sample value
n=received sample index
y=estimated sample value

Referring to FIGS. 2 and 3, in one embodiment, the error signal(s) comprise processed error signals accumulated 112 to provide error information, e.g. for error analysis and/or calibration. No feedback loop is necessarily involved. As above, the error term processor 80 may delay 115 the input sample 53 of the magnetic read signal to align the input sample 53 of the magnetic read signal with the determined sample value 116 from sample logic 68. Since there is no feedback loop and no sensitivity to a delay, and, therefore, the intermediate bit sequence obtained by selector 71 extends from an initiation point which is close to the output 56 of PRML Viterbi detector 49 so that the intermediate bits are more accurate. Alternatively, since no feedback loop is involved, the input sample 53 of the magnetic read signal and the determined sample value 116 may be stored and aligned by the relative positions as stored.

One example of an error term that may be calculated by error term processor 112 comprises a mean squared error for signal to noise ratio estimation:

MSE for SNR measurements by the Calibration Block $calibration = (y_n - \hat{y}_n)^2_{metric}$ Where:
y=received sample value
n=received sample index
y=estimated sample value Those of skill in the art understand that many alternative metrics may be gathered from the determined sample values 116 from sample logic 68 of FIG. 2 and utilized, e.g. by the controller 18 of FIG. 1, or by the host 20, or supplied at interface 21 for offline use.

A generalized embodiment of a method in accordance with the methodologies discussed above is illustrated in FIG. 5.

In one embodiment, magnetic tape read channel signal values are developed employing intermediate bits of the path memory of a PRML Viterbi detector. As discussed above, a PRML Viterbi detector comprises an input, path metrics, a path memory, and an output.

In step 130, a most likely path memory state is identified from the PRML Viterbi detector path metrics. In the embodiment of FIG. 3, identification logic 70 identifies a most likely path memory state of the PRML Viterbi detector 49 from the path metrics 54 of the PRML Viterbi detector. In one embodiment, the identification logic 70 compares all of the path metrics of the PRML Viterbi detector, and identifies the path metric having the greatest probability.

Figure 5:
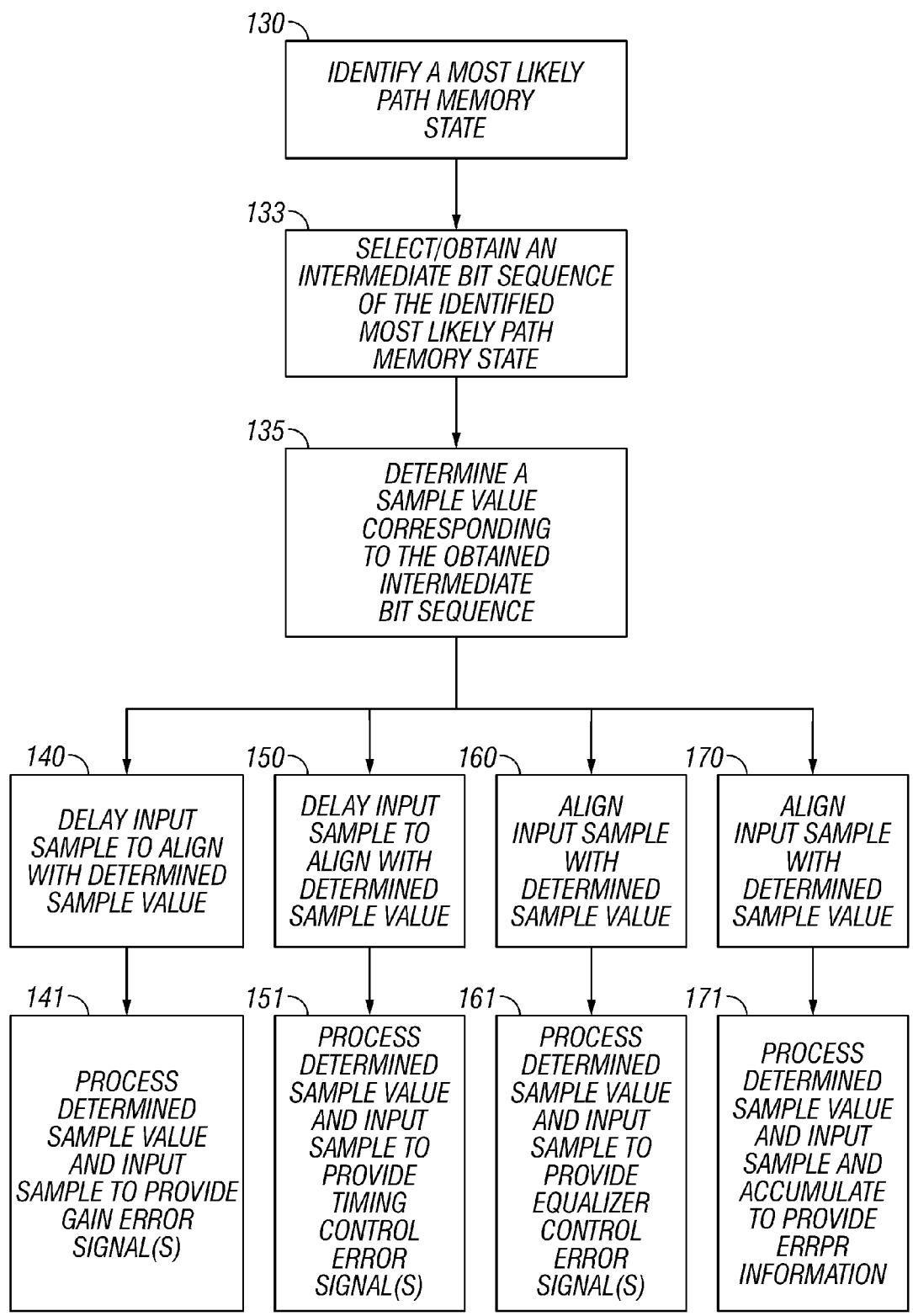
FIG. 5 is a flow chart illustrating an embodiment of a method in accordance with the present invention.

In step 133 of FIG. 5, an intermediate bit sequence of the most likely path memory state identified in step 130 is obtained, the intermediate bit sequence extending from an initiation point of the path memory which is intermediate the output and the input of the PRML Viterbi detector. As discussed above, the intermediate bit sequence may be selected in advance and fixed, or may be programmably selected. In the embodiment of FIG. 3, a selector 71 of sample logic 68 obtains a bit sequence from the path memory of the PRML Viterbi detector. The bit sequence is obtained from the path memory state identified by the identification logic 70, and is an intermediate bit sequence of the identified most likely path memory state.

The intermediate bit sequence obtained by selector 71 extends from an initiation point which is intermediate the output and the input of the PRML Viterbi detector. The initiation point corresponds to the time index of an input sample of the magnetic read signal which has been processed by the PRML Viterbi detector through various steps to reach the initiation point. As one example, the input sample has been processed when it was received by the PRML Viterbi detector, and each time a subsequent input sample has been received. Thus, the intermediate bits along the path memory represent the sequence of "data" of the received samples at the specific points of analysis by the PRML Viterbi detector.

In step 135 of FIG. 5, a sample value is determined which corresponds to the intermediate bit sequence obtained in step 133.

The determined sample value of step 135 may be applied to many uses.

One set of examples comprises developing error signals.

In an example of steps 140 and 141, the error signal(s) comprise gain error signal(s) provided by an error processor in step 141 to derive metrics for driving a gain control feedback loop. The input sample of the magnetic read signal is delayed in step 140 to align the input sample of the magnetic read signal with the determined sample value.

In an example of steps 150 and 151, in one embodiment, the error signal(s) comprise timing error signal(s) provided by a timing error processor in step 151 to derive metrics for driving a timing control feedback loop. The input sample of the magnetic read signal is delayed in step 150 to align the input sample of the magnetic read signal with the determined sample value.

In the example of steps 160 and 161, in one embodiment, the error signal(s) comprise equalizer error signal(s) provided in step 161 by an equalizer error processor to derive metrics for providing equalizer control error signal(s), e.g. for deriving equalizer parameter metrics. The equalizer parameters may or may not comprise a feedback loop.

The error term processor, in step 160, may delay 105 the input sample 53 of the magnetic read signal to align the input sample 53 of the magnetic read signal with the determined sample value 106 from sample logic 68. Alternatively, if no feedback loop were involved, for example the equalizer parameter metrics were to be defined offline, in step 160, the input sample of the magnetic read signal and the determined sample value may be stored and aligned by the relative positions as stored.

In the example of steps 170 and 171, in one embodiment, the error signal(s) comprise processed error signals accumulated in step 171 to provide error information, e.g. for error analysis and/or calibration. No feedback loop is necessarily involved. As above, an error term processor may delay the input sample of the magnetic read signal in step 170 to align the magnetic read signal with the determined sample value. Alternatively, since no feedback loop is involved, the input sample of the magnetic read signal and the determined sample value may be stored in step 170 and aligned by the relative positions as stored.

The logic and the methodology of the present invention may be implemented in any suitable form known to those of skill in the art.

Those of skill in the art will understand that changes may be made with respect to the steps of the methodology, and steps may be combined. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. Sample logic configured to provide at least one sample value signal with respect to input samples of a magnetic read signal, said input samples provided at an input of a PRML Viterbi detector additionally having path metrics, a path memory, and an output, said path memory comprising bits representing the specific points of analysis in a time index of said input signals, by said path metrics and said path memory of the sequence of samples received at said input, said sample logic comprising:

identification logic configured to identify a most likely path memory state of said PRML Viterbi detector from said path metrics of said PRML Viterbi detector;

a selector configured to obtain from said path memory of said PRML Viterbi detector, an intermediate bit sequence from said specific points of analysis of said time index of said identified most likely path memory state, said intermediate bit sequence extending from an initiation point of said analysis by said path metrics and said path memory which is intermediate said sequence of samples at said output and received at said input of said PRML Viterbi detector, said initiation point corresponding to an input sample of said magnetic read signal;

most likely sample logic configured to determine a sample value corresponding to said obtained intermediate bit sequence;

wherein said selector is configured to programmably select said initiation point out of a plurality of initiation points; and an error term processor configured to process said sample value and an input sample from said input corresponding to said initiation point to provide at least one error signal.

2. Sample logic configured to provide at least one sample value signal with respect to input samples of a magnetic read signal, said input samples provided at an input of a PRML Viterbi detector additionally having path metrics, a path memory, and an output, said path memory comprising bits representing the specific points of analysis in a time index of said input signals, by said path metrics and said path memory of the sequence of samples received at said input, said sample logic comprising:

identification logic configured to identify a most likely path memory state of said PRML Viterbi detector from said path metrics of said PRML Viterbi detector;

a selector configured to obtain from said path memory of said PRML Viterbi detector, an intermediate bit sequence from said specific points of analysis of said time index of said identified most likely path memory state, said intermediate bit sequence extending from an initiation point of said analysis by said path metrics and said path memory which is intermediate said sequence of samples at said output and received at said input of said PRML Viterbi detector, said initiation point corresponding to an input sample of said magnetic read signal;

most likely sample logic configured to determine a sample value corresponding to said obtained intermediate bit sequence;

wherein said most likely sample logic is configured to select from a table a sample value identified as matching said obtained intermediate bit sequence; and an error term processor configured to process said sample value and an input sample from said input corresponding to said initiation point to provide at least one error signal.

3. A magnetic tape read channel detector, comprising:

a PRML Viterbi detector having an input, path metrics, a path memory, and an output, said path memory comprising bits representing the specific points of analysis in a time index of said input signals, by said path metrics and said path memory of the sequence of samples received at said input, said sample logic;

identification logic configured to identify a most likely path memory state of said PRML Viterbi detector from said path metrics of said PRML Viterbi detector;

a selector configured to obtain from said path memory of said PRML Viterbi detector, an intermediate bit sequence from said specific points of analysis of said time index of said identified most likely path memory state, said intermediate bit sequence extending from an initiation point of said analysis by said path metrics and said path memory which is intermediate said sequence of samples at said output and received at said input of said PRML Viterbi detector, said initiation point corresponding to an input sample of a magnetic read signal; and most likely sample logic configured to determine a sample value corresponding to said obtained intermediate bit sequence;

wherein said selector is configured to programmably select said initiation point out of a plurality of said initiation points; and an error term processor configured to process said sample value and an input sample from said input corresponding to said initiation point to provide at least one error signal.

4. A magnetic tape read channel detector, comprising:

a PRML Viterbi detector having an input, path metrics, a path memory, and an output, said path memory comprising bits representing the specific points of analysis in a time index of said input signals, by said path metrics and said path memory of the sequence of samples received at said input, said sample logic;

identification logic configured to identify a most likely path memory state of said PRML Viterbi detector from said path metrics of said PRML Viterbi detector;

a selector configured to obtain from said path memory of said PRML Viterbi detector, an intermediate bit sequence from said specific points of analysis of said time index of said identified most likely path memory state, said intermediate bit sequence extending from an initiation point of said analysis by said path metrics and said path memory which is intermediate said sequence of samples at said output and received at said input of said PRML Viterbi detector, said initiation point corresponding to an input sample of a magnetic read signal; and most likely sample logic configured to determine a sample value corresponding to said obtained intermediate bit sequence;

wherein said most likely sample logic is configured to select from a table a sample value identified as matching said obtained intermediate bit sequence; and an error term processor configured to process said sample value and an input sample from said input corresponding to said initiation point to provide at least one error signal.

5. A magnetic tape drive, comprising:

at least one read head;

a drive system is configured to move a magnetic tape with respect to said at least one read head such that said at least one read head may detect magnetic signals on said magnetic tape;

a read channel configured to digitally sample magnetic signals detected by said at least one read head, providing digital samples of said magnetic signals; and a magnetic tape read channel detector, comprising:

a PRML Viterbi detector having an input, path metrics, a path memory, and an output, said path memory comprising bits representing the specific points of analysis in a time index of said input signals, by said path metrics and said path memory of the sequence of samples received at said input, said sample logic;

identification logic configured to identify a most likely path memory state of said PRML Viterbi detector from said path metrics of said PRML Viterbi detector;

a selector to obtain from said path memory of said PRML Viterbi detector, an intermediate bit sequence from said specific points of analysis of said time index of said identified most likely path memory state, said intermediate bit sequence extending from an initiation point of said analysis by said path metrics and said path memory which is intermediate said sequence of samples at said output and received at said input of said PRML Viterbi detector, said initiation point corresponding to an input sample of said magnetic read signal;

most likely sample logic configured to determine a sample value corresponding to said obtained intermediate bit sequence;

wherein said selector is configured to programmably select said initiation point out of a plurality of initiation points; and an error term processor configured to process said sample value and an input sample from said input corresponding to said initiation point to provide at least one error signal.

6. A magnetic tape drive, comprising:

at least one read head;

a drive system is configured to move a magnetic tape with respect to said at least one read head such that said at least one read head may detect magnetic signals on said magnetic tape;

a read channel configured to digitally sample magnetic signals detected by said at least one read head, providing digital samples of said magnetic signals; and a magnetic tape read channel detector, comprising:

a PRML Viterbi detector having an input, path metrics, a path memory, and an output, said path memory comprising bits representing the specific points of analysis in a time index of said input signals, by said path metrics and said path memory of the sequence of samples received at said input, said sample logic;

identification logic configured to identify a most likely path memory state of said PRML Viterbi detector from said path metrics of said PRML Viterbi detector;

a selector to obtain from said path memory of said PRML Viterbi detector, an intermediate bit sequence from said specific points of analysis of said time index of said identified most likely path memory state, said intermediate bit sequence extending from an initiation point of said analysis by said path metrics and said path memory which is intermediate said sequence of samples at said output and received at said input of said PRML Viterbi detector, said initiation point corresponding to an input sample of said magnetic read signal;

most likely sample logic configured to determine a sample value corresponding to said obtained intermediate bit sequence;

wherein said most likely sample logic is configured to select from a table a sample value identified as matching said obtained intermediate bit sequence; and an error term processor configured to process said sample value and an input sample from said input corresponding to said initiation point to provide at least one error signal.

* * * * *